(12) United States Patent
Jacobsen

(10) Patent No.: US 7,142,502 B2
(45) Date of Patent: Nov. 28, 2006

(54) TECHNIQUE FOR CONTINUOUS OFDM DEMODULATION

(75) Inventor: Eric A. Jacobsen, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 09/943,872

(22) Filed: Aug. 30, 2001

(65) Prior Publication Data

US 2003/0053411 A1    Mar. 20, 2003

(51) Int. Cl.
*H04J 11/00* (2006.01)
*H04J 3/06* (2006.01)

(52) U.S. Cl. ..................... 370/208; 370/509
(58) Field of Classification Search .......... 370/203, 370/208, 209
See application file for complete search history.

(56) References Cited

U.S. PATENT DOCUMENTS

| 4,384,362 | A | * | 5/1983 | Leland | 455/447 |
| 5,596,582 | A | * | 1/1997 | Sato et al. | 370/509 |
| 6,122,246 | A | * | 9/2000 | Marchok et al. | 370/208 |
| 6,314,113 | B1 | * | 11/2001 | Guemas | 370/480 |
| 2002/0041637 | A1 | * | 4/2002 | Smart et al. | 375/316 |

FOREIGN PATENT DOCUMENTS

| EP | 0 837 582 A2 | 4/1998 |
| EP | 0 961 449 A2 | 12/1999 |
| EP | 1 047 236 A1 | 10/2000 |

\* cited by examiner

*Primary Examiner*—Alpus H. Hsu
*Assistant Examiner*—Daniel J. Ryman
(74) *Attorney, Agent, or Firm*—Trop, Pruner & Hu, P.C.

(57) ABSTRACT

A technique includes receiving a signal that indicates a modulated symbol during a given time slice of the signal. Sliding window frequency transformations of the signal are performed, and each sliding window transformation is associated with a different time interval of the signal. One of the time intervals is selected to correspond to the time slice. The result of the frequency transformation associated with the selected time interval is used to obtain an indication of the demodulated symbol.

19 Claims, 9 Drawing Sheets

| TOTAL NO. OF SUBCARRIERS (N) | PROCESSING REQUIRED FOR FFT Nlog2(N) | EQUIVALENT SUBCARRIERS USING swDFT: sqrt(Nlog2(N)) |
|---|---|---|
| 16 | 64 | 4 |
| 32 | 160 | 5 |
| 64 | 384 | 6 |
| 128 | 896 | 7 |
| 256 | 2048 | 8 |
| 512 | 4608 | 9 |
| 1024 | 10240 | 10 |
| 2048 | 22530 | 11 |
| 4096 | 49150 | 12 |

FIG. 6

TECHNIQUE FOR CONTINUOUS OFDM DEMODULATION

BACKGROUND

The invention generally relates to a technique for continuous demodulation of Orthogonal Frequency Division Multiplexing (OFDM) signals.

Many recent implementations of digital wireless communication systems (wireless or cable-based systems, for example) use Orthogonal Frequency Division Multiplexing (OFDM) for environments where there are strong interference or multipath reflections. However, one disadvantage of using OFDM is the use of a Fast Fourier Transform (FFT) and an inverse FFT (IFFT) in the demodulator (for an OFDM transmitter) and modulator (for an OFDM receiver), respectively. In this manner, the calculation of the FFT and inverse FFT may add a considerable amount of complexity to the OFDM transmitter/receiver due to the large processing block that is required on each end of the communication link.

While OFDM may offer superior performance in fading, interference and multipath environments, it is not without its disadvantages. For example, one disadvantage that is associated with OFDM is the difficulty in synchronization, a difficulty that may lead to long acquisition times that may adversely effect the overall system performance. In this manner, the OFDM signal includes modulated OFDM symbols. Each symbol, in turn, appears during a particular time slot. Thus, to demodulate the OFDM signal to extract a particular symbol, the demodulation must be synchronized with the time slot. Many OFDM systems use pilot tones for channel estimation as well as to aid in the synchronization. The OFDM systems that use the pilot tones modulate or scramble the pilot tones in order to reduce the transmit peak-to-average power ratio.

For purposes of maximizing statistical multiplexing gain, many communication systems assign subsets of OFDM subcarriers to individual users, terminals or electrical devices in both the upstream and downstream directions. In this manner, the data that is associated with a particular user, terminal or electrical device is modulated at the OFDM transmitter via an associated subset of OFDM subcarriers. The resultant OFDM modulated signal is then modulated via an RF carrier signal, and this carrier modulated signal is transmitted over a wireless link (for example) for reception by an OFDM receiver. This OFDM modulation technique is commonly called OFDMA for Orthogonal Frequency Division Multiple Access.

The FFT is an N point operation, i.e., the FFT is based on a set of N subcarriers. In this manner, for the OFDM receiver, the data that is assigned to a particular subset of the subcarriers forms an FFT input vector that is processed via the FFT to produce the demodulated OFDM frequency coefficients that indicate a particular demodulated OFDM symbol.

As noted above, it is possible that some of the OFDM subcarriers may not be assigned to a particular transmitter. As a result, the block computation of the FFT for OFDM demodulation may involve calculating frequency coefficients for subcarriers that are not being used, thereby resulting in inefficient computation of the FFT.

Thus, there exists a continuing need for a technique or arrangement that addresses one or more of the problems that are stated above.

BRIEF DESCRIPTION OF THE DRAWING

FIG. 6 is a table depicting a comparison of the demodulation technique of the present invention and a demodulation technique of the prior art.

DETAILED DESCRIPTION

Figure 1:
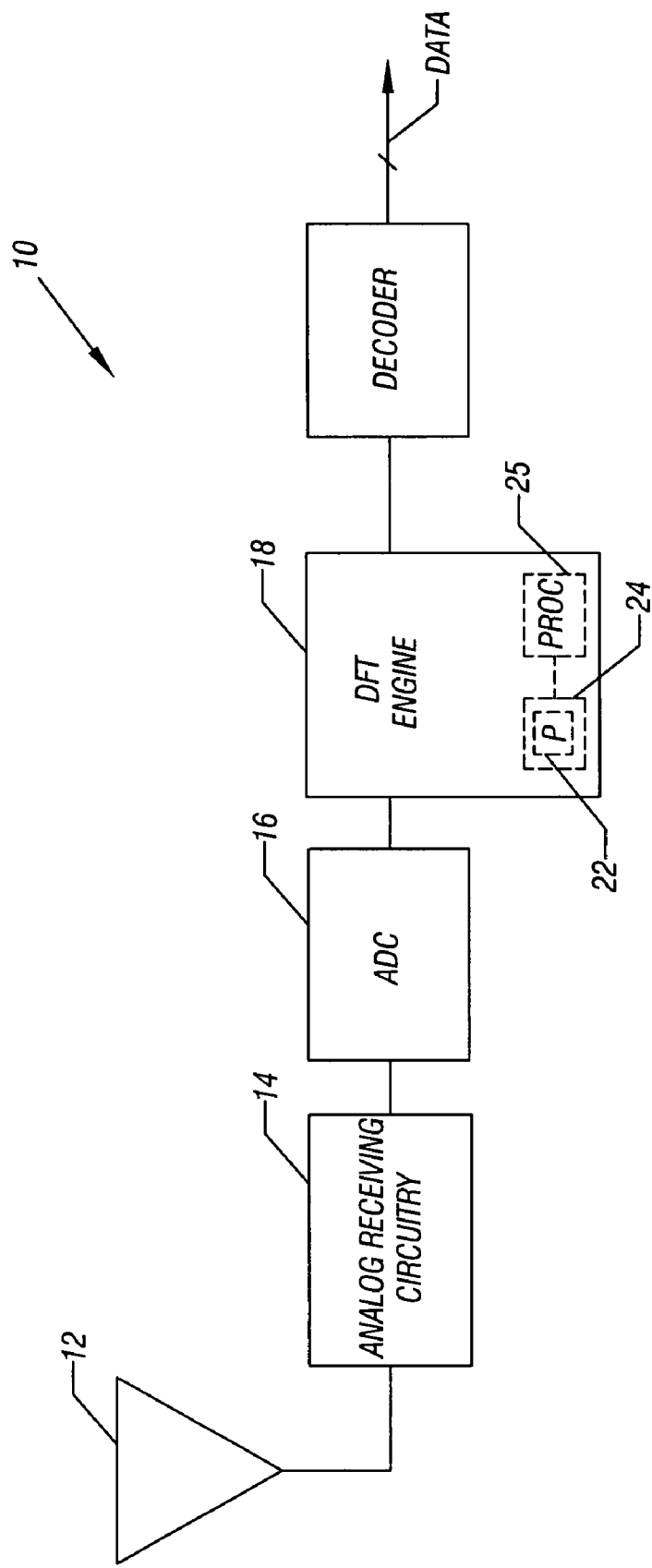
FIG. 1 is a schematic diagram of an OFDM receiver according to an embodiment of the invention.

Referring to FIG. 1, an embodiment 10 of an OFDM receiver in accordance with the invention continuously performs a Discrete Fourier Transform (DFT) to continuously demodulate a received OFDM signal. In this manner, as described below, the receiver includes a DFT engine 18 that performs a sliding window DFT to continuously demodulate the received OFDM signal. More specifically, in some embodiments of the invention, the DFT engine 18 continually performs DFTs on the received OFDM signal by effectively sliding a window of a fixed length in time over the received OFDM signal. In this manner, this window slides in time over discrete time samples of the received OFDM signal, so that the DFT engine 18 calculates a DFT for each position of the window. As described below, in the course of calculating these DFTs, the DFT engine 18 determines the optimal time interval for capturing a particular OFDM symbol and selects one of the DFTs associated with this optimal time interval to extract, or derive, the OFDM symbol.

Figure 2:
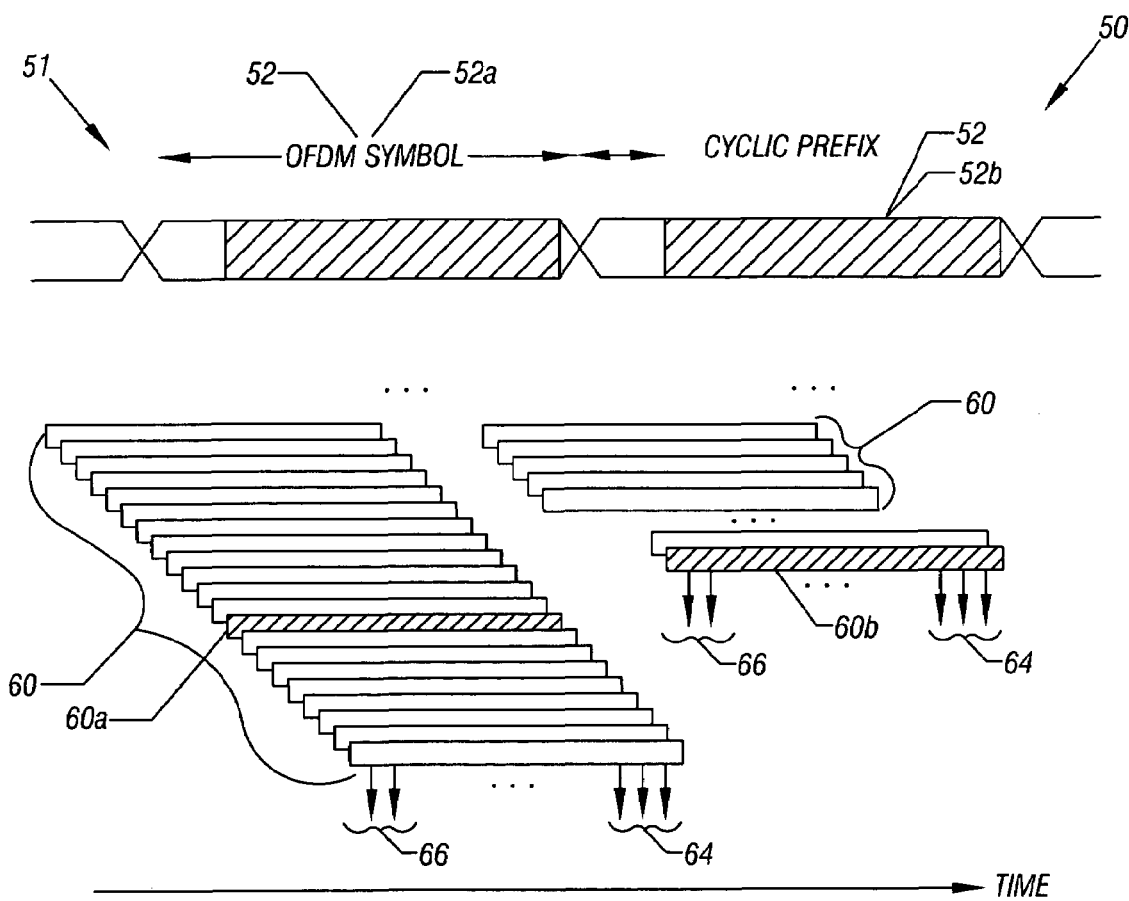
FIG. 2 is an illustration depicting demodulation of an OFDM signal according to an embodiment of the invention.

Referring to both FIGS. 1 and 2, regarding the specific structure of the receiver 10, the receiver 10 includes an antenna 12 that receives an OFDM signal 51 (see FIG. 2) that includes OFDM symbols 52 (OFDM symbols 52a and 52b, depicted as examples). Each symbol 52 is associated with a different time slice, or slot, of the OFDM signal 51. The OFDM signal 51 is processed by analog receiving circuitry 14, and the results are furnished to an analog-to-digital converter (ADC) 16 that furnishes a digital indication (i.e., discrete time samples) of the OFDM signal 51. This analog indication is processed by the DFT engine 18 in a manner that continuously computes a sliding window DFT.

More particularly, in some embodiments of the invention, the DFT engine 18, for each new discrete time sample, generates a DFT based on discrete time samples that are contained in a particular window 60. Thus, each successive DFT is computed using a window 60 that includes one new sample and one less sample that were used in the computation of the previous sliding window DFT. As depicted in FIG. 2, the sliding window 60 eventually becomes substantially aligned with the particular OFDM symbol 52 to be demodulated. For example, the OFDM symbol 52a aligns with the sliding window 60a. Thus, the sliding window 60a is in the optimal position for demodulation of the OFDM symbol 52a. The DFT that is calculated using the time samples in the window 60 produces an indication of the demodulated OFDM symbol 52a. Similarly, the sliding window 60b is substantially aligned with the OFDM symbol 52b. As described below, the DFT engine 18 determines which sliding window 60 to select as the optimal time interval for the particular OFDM symbol 52 (i.e., to select the window 60 that is synchronized to the OFDM symbol 52), and the selected window 60 has a corresponding DFT that provides an indication of the demodulated OFDM symbol.

As depicted in FIG. 2, each sliding window DFT produces coefficients 64 corresponding to the output subcarriers of the OFDM symbol and coefficients 66 that, as described below, correspond to pilot tones that are used to find the optimal point for the demodulation of a particular OFDM symbol 52. Thus, use of the sliding window DFT allows the OFDM subcarriers to be used in the synchronization process, as described below.

Therefore, the demodulation technique that is performed by the DFT engine 18 provides continuous computation of the DFT of the received OFDM signal. This technique allows time synchronization and frequency synchronization to be performed strictly in the frequency domain, which offers many advantages, including the benefits of the processing gains from computation of the transform. In addition, the technique that is performed by the DFT engine 18 also allows a particular demodulator to skip computation of subcarriers not intended for a particular user or terminal. This provides a reduction in the processing requirements for the DFT engine 18, as described below.

Figure 3:
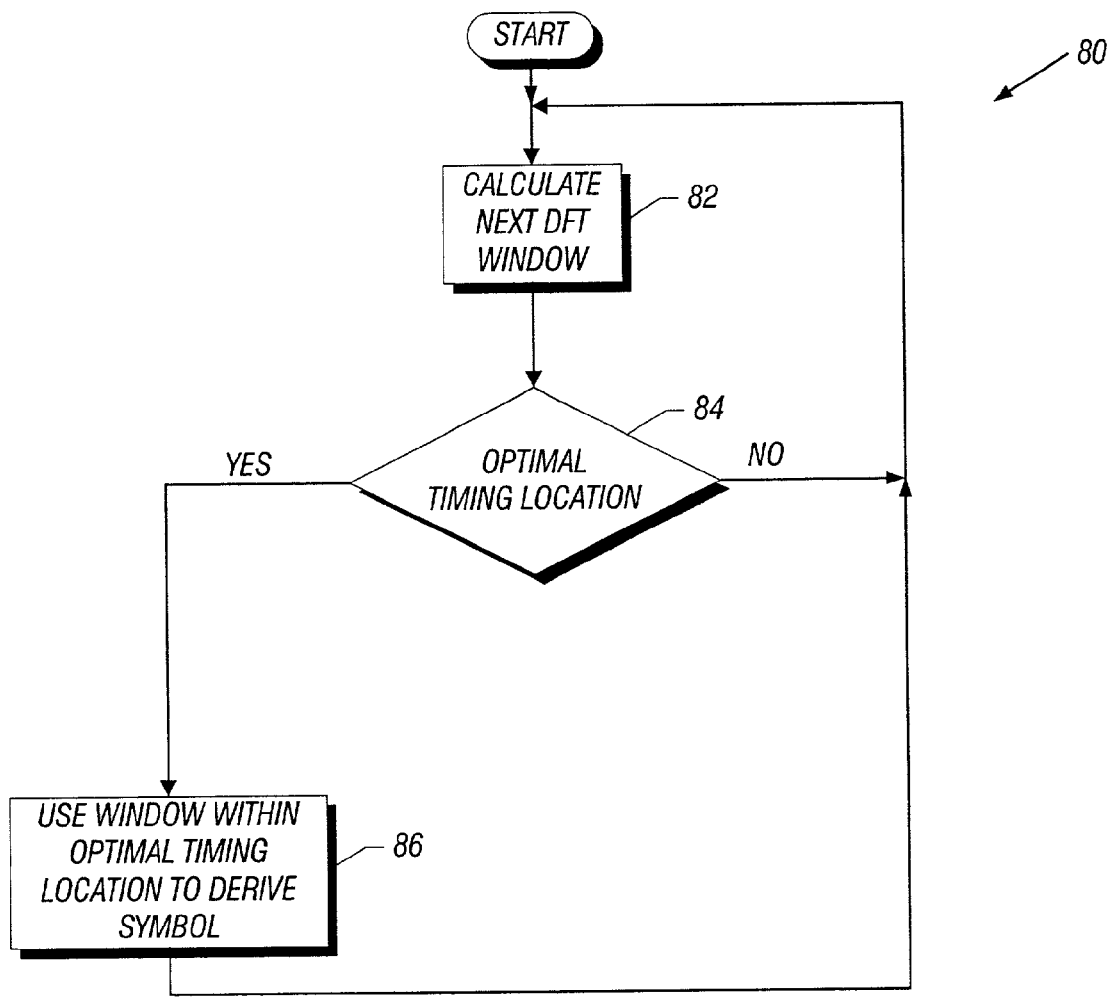
FIG. 3 is a flow diagram depicting a technique to demodulate an OFDM signal according to an embodiment of the invention.

The DFT engine 18, in some embodiments of the invention, includes a processor 25 that executes instructions, such as a program 22 that is stored in a memory 24 of the DFT engine 18. The program 22 causes the processor 25 to perform a technique 80 that is depicted in FIG. 3. In this manner, referring to FIG. 3, in the performance of the technique 80, the DFT engine 18 calculates (block 82) the next sliding window DFT. After calculating the next sliding window DFT, the DFT engine 18 determines (diamond 84) whether the associated window 60 is in an optimal timing location to demodulate a particular OFDM symbol. If not, the DFT engine 18 calculates (block 82) the next sliding window DFT. Otherwise, the DFT engine 18 uses (block 86) the DFT to derive a demodulated OFDM symbol. This use may include the DFT engine 18 tagging a particular DFT result for later derivation of a particular OFDM symbol. Subsequently, the DFT engine 18 returns to block 82 to calculate the next sliding window DFT.

Figure 4:
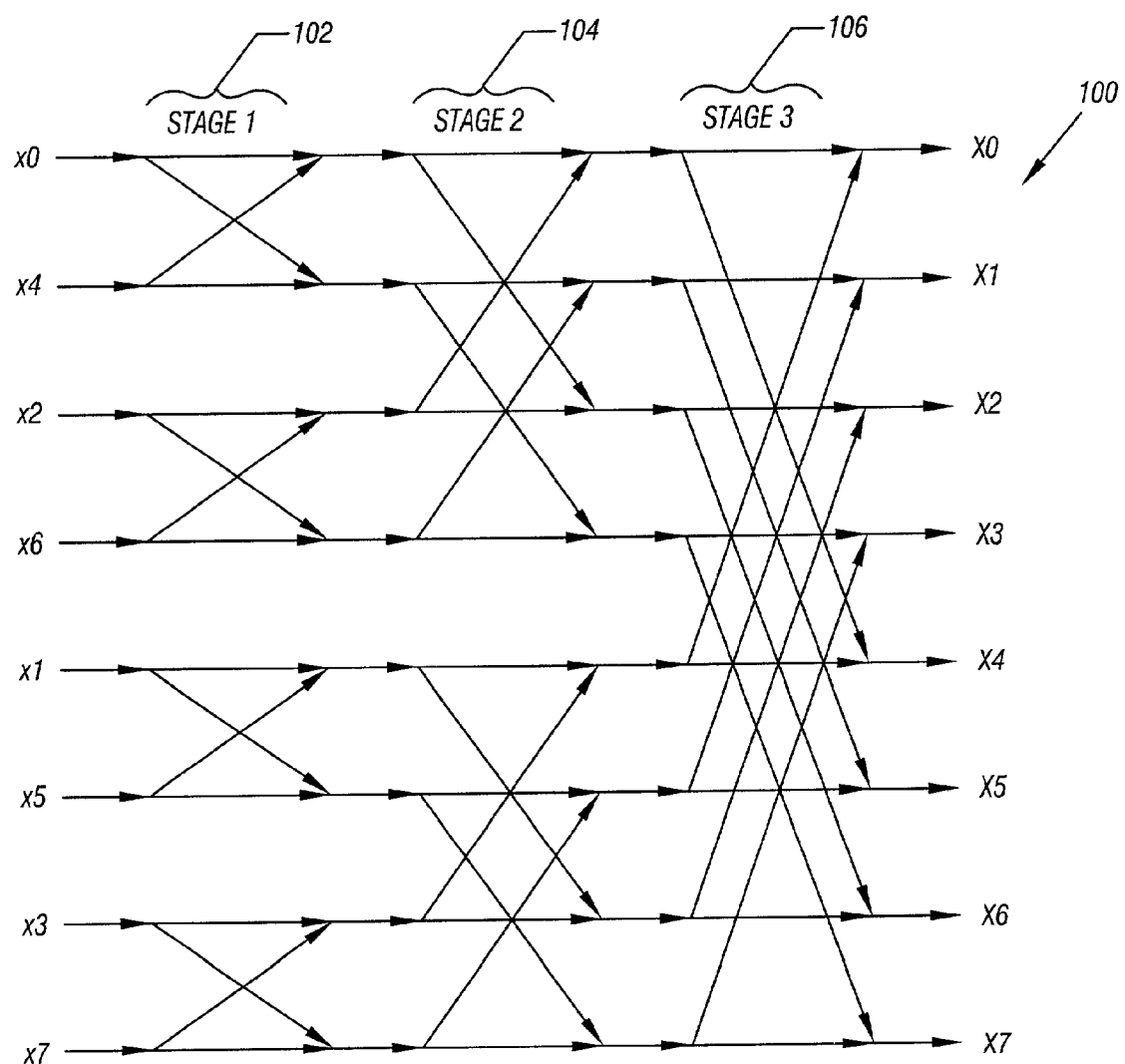
FIG. 4 is a signal flow diagram for the computation of an inverse Radix-two FFT of the prior art.

The extent of the mathematical operations that are performed in conventional OFDM receivers because of the processing of coefficients that are associated with non-used OFDM subcarriers becomes apparent when a signal flow diagram of the conventional FFT is examined. For example, FIG. 4 depicts a signal flow diagram for the computation of a Radix-two FFT, a FFT used by conventional OFDM receivers. As shown, for an eight point Radix-two FFT, three stages 102, 104 and 106 are used to compute the FFT. Additional stages may be added to compute a larger FFT. As depicted in FIG. 4, each frequency coefficient ($X_0$, $X_1$, $X_2$ ... $X_7$) that is provided by the last stage 106 depends on every discrete time value ($x_1$, $x_2$, $x_3$ ... $x_n$) of the input vector. Thus, processing a coefficient for a particular subcarrier that is not used produces a significant number of unnecessary mathematical operations.

Figure 5:
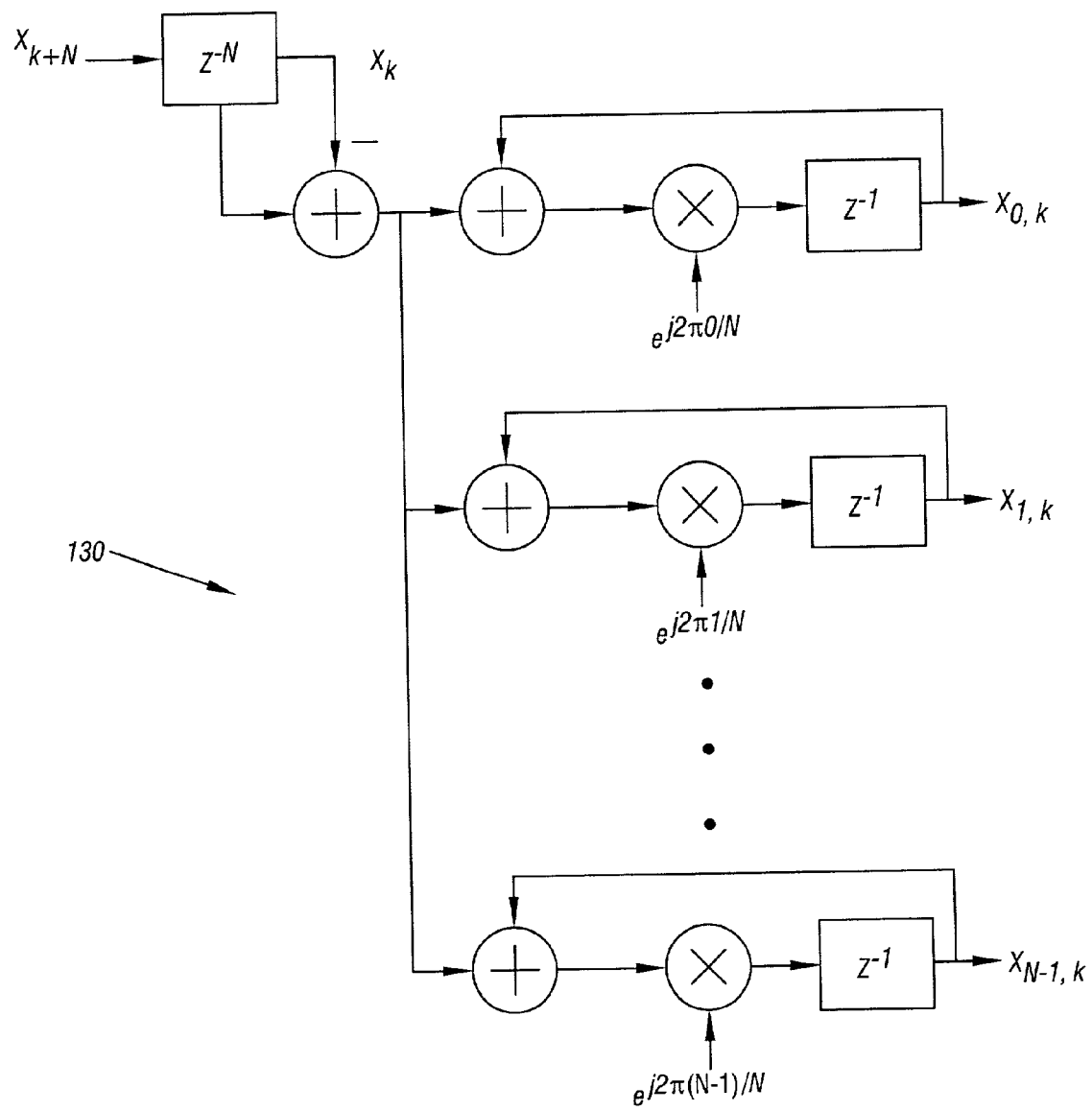
FIG. 5 is a signal flow diagram for the computation of a DFT according to an embodiment of the invention.

In contrast to the conventional OFDM receiver, the receiver 10 (FIG. 1) includes the DFT engine 18 that calculates the frequency coefficients for each transformation pursuant to the signal flow diagram 130 that is depicted in FIG. 5. The results of the signal flow diagram 130 may be simplified down to the following mathematical relationship:

$$X_{f,k+1} = e^{j2\pi f/N} \cdot (X_{f,k} + x_{k+N} - x_k),$$  Equation (1)

where "X" indicates a particular subcarrier frequency coefficient at a particular time, as indexed by a particular subcarrier frequency called "f" and a coefficient "k" that indexes a particular sliding window 60 (FIG. 2). The coefficient "N" is the length, of the number of discrete time samples in the window 60. The notation "x" denotes a discrete time sample indexed by the "k" coefficient or "k+N" coefficient. As shown, each output frequency coefficient "X" is computed independent of the other frequency coefficients. This permits unneeded output computations to be skipped for unused subcarriers, thereby saving processing cycles for the DFT engine 18 and more efficient computation of the DFT.

As an example, a table 160 in FIG. 6 depicts a comparison of the technique 80 used by the DFT engine 18 with Radix-two FFT computations. In particular, the entries in column 162 are different numbers of available OFDM subcarriers (assigned and unassigned); the entries in column 164 are the numbers of computations required by the Radix-two FFT computations for the different OFDM subcarriers; and the entries of column 166 define points where the calculations by the DFT engine 18 are more efficient than the calculations of the Radix-two FFT. In this manner, for the case where the number of assigned subcarriers (column 162) does not exceed the values indicated in column 166, the technique provided by the DFT engine 18 provides a computational benefit over the conventional FFT-based demodulation.

For example, if the total number of available subcarriers is 64 (row 3 of column 162), then as long as six or less subcarriers are assigned, the DFT engine 18 is computationally more efficient than an engine that uses Radix-two FFT computations.

Thus, the technique that is used by the DFT engine 18 has the following additional advantages over traditional techniques that use the FFT. First, the technique that is provided by the DFT engine 18 provides a flexibility in block size, i.e., the number of subcarriers that are computed. In this manner, because the subcarriers are each computed independently in the sliding window DFT technique, a change in the number of subcarriers, either in total or for a particular terminal, is easily accommodated. The number of subcarriers actually computed thus can be any number without restrictions as to length of powers of two, primes or other algorithm-related limitations. Secondly, the sliding window DFT technique described herein permits faster acquisition. In this manner, because time and frequency synchronization may be done directly in the frequency domain at a greatly increased sample rate, acquisition time may be reduced significantly. This may be particularly important since long acquisition time is a consequence of many of the conventional synchronization algorithms. Thirdly, changes in the sample rate relative to the OFDM sample, regardless of the number of subcarriers or the number of subcarriers being processed, may be accommodated by adjusting the phase of the coefficient in each output calculation. No address bit reverse processing or buffering may be required. Lastly, latency is reduced due to the technique provided by the DFT engine 18. In this manner, the recursive nature of the technique that is used by the DFT engine 18 greatly reduces the latency. The required number of computations from the receipt of the last time domain sample in the OFDM symbol to obtain the demodulated subcarriers is on the order of "N" instead of on the order of "$N^*\log_2(N)$."

The sliding window technique that is used by the DFT engine 18 may be derived, as described below. In this manner, for a vector x of dimension N, the Discrete Fourier Transform of x is defined as:

$$X_f = \sum_{n=0}^{N-1} x_n \cdot e^{-j2\pi fn/N}, \qquad \text{Equation (2)}$$

where "n" is the time index and "f" is the frequency index. Adding an additional time index, k, which controls the slide of the DFT over multiple input windows of length N, yields a two-dimensional definition of a sliding DFT as:

$$X_{f,k} = \sum_{n=0}^{N-1} x_{n+k} \cdot e^{-j2\pi fn/N}, \qquad \text{Equation (3)}$$

The DFT of the (k+1)th element can be rewritten as:

$$X_{f,k+1} = \sum_{n=0}^{N-1} x_{n+k+1} \cdot e^{-j2\pi fn/N}, \qquad \text{Equation (4)}$$

Substituting p=n+1, where the range of p is 1 to N yields:

$$X_{f,k+1} = \sum_{p=1}^{N-1} x_{p+k} \cdot e^{-j2\pi fn(p-1)/N}, \qquad \text{Equation (5)}$$

The summation may be changed by formally expressing the Nth component separately and adding the p=0 case. The added case is then subtracted formally as described in Equation 6 below. Consequently, the range of p is now 0 to N−1.

$$X_{f,k+1} = \left[\sum_{p=0}^{N-1} x_{p+k} \cdot e^{-j2\pi f(p-1)/N}\right] + \qquad \text{Equation (6)}$$
$$= x_{k+N} \cdot e^{-j2\pi f(N-1)/N} - x_k \cdot e^{j2\pi f/N},$$

The single rotation exponential can be factored out as follows:

$$X_{f,k+1} = e^{j2\pi f/N} \cdot \left(\left[\sum_{p=0}^{N-1} x_{p+k} \cdot e^{-j2\pi f(p)/N}\right] + \qquad \text{Equation (7)}\right.$$
$$\left. x_{k+N} \cdot e^{-j2\pi fN/N} - x_k\right),$$

The exponential with the k+N term always has phase=2π and is therefore equal to 1, so:

$$X_{f,k+1} = e^{j2\pi f/N} \cdot \left(\left[\sum_{p=0}^{N-1} x_{p+k} \cdot e^{-j2\pi fp/N}\right] + \qquad \text{Equation (8)}\right.$$
$$\left. x_{k+N} - x_k\right),$$

Note that the summation is the DFT of the kth vector, and the expression can be rewritten as Equation (1), above. This yields a recursive structure where the (k+1)th DFT is computed using the output of the kth DFT. The difference of the oldest and newest time inputs is computed and added to the output of each element of the previous DFT. Each DFT output is then individually multiplied by a rotational constant that is fixed for each frequency bin. The computation of the sliding-window DFT can be initialized by starting with the input and output buffers set to all zeros. As k increments the new data is trickled in until the input buffer is full, at which point the output becomes valid.

Figure 7:
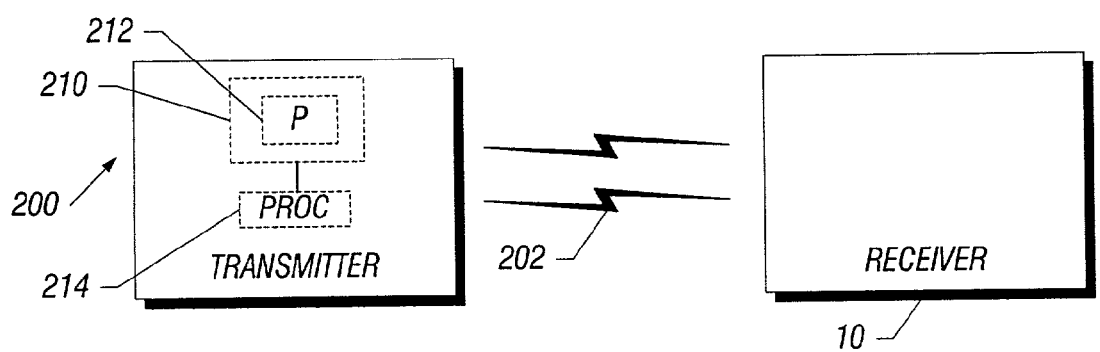
FIG. 7 is a schematic diagram of a transmitter according to an embodiment of the invention.
Figure 8:
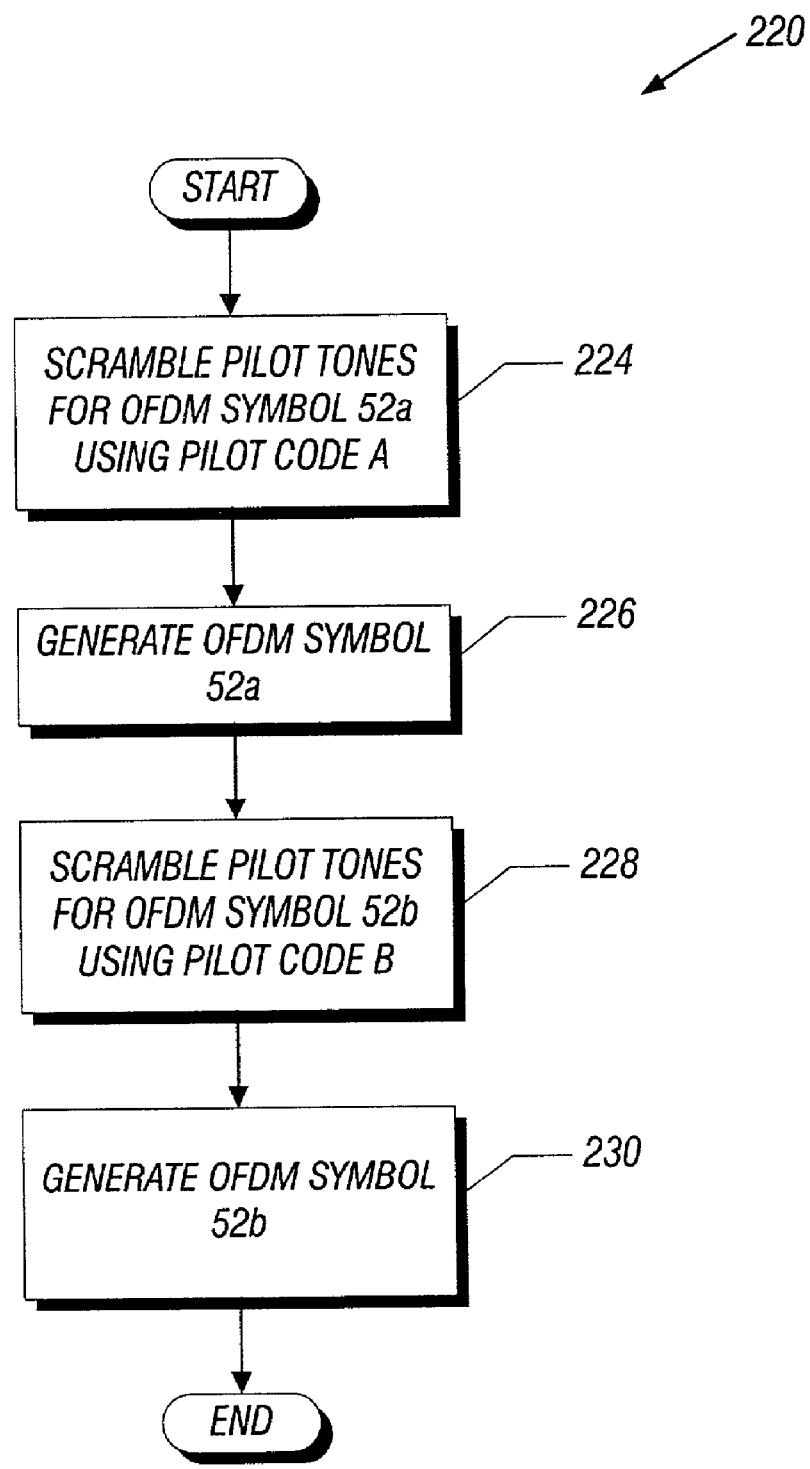
FIG. 8 is a flow diagram depicting an OFDM symbol generation technique according to an embodiment of the invention.

Referring to FIG. 7, in some embodiments of the invention, the receiver 10 may communicate (over a wireless link 202 or a cable-based link, as examples) via an OFDM transmitter 200. The transmitter 200 includes a processor 214 that executes instructions, or a program 212, that is stored in a memory 210 of the transmitter 200. In response to the processor 214 executing the program 212, the program 212 causes the processor 214 to perform a technique 220 that is depicted in FIG. 8. In this manner, in this technique 220, the transmitter 200 inserts information into the OFDM signal that aids the receiver 10 in synchronizing demodulation of the OFDM symbols using the above-described sliding window DFT technique.

More particularly, referring to FIG. 8, in the technique 220, the processor 214 scrambles (block 224) pilot tones for a particular OFDM symbol 52*a* (see FIG. 9) using a pilot code, such as a pilot code denoted by the suffix "A," in particular example. After scrambling the pilot tones, the processor 214 generates (block 226) the OFDM symbol 52*a*. Subsequently, the processor 200 scrambles (block 228) pilot tones for the OFDM 52*b* (see FIG. 9) using a different pilot code (demoted by the suffix "B,") in this example. The processor 200 then generates (block 230) the OFDM symbol 52*b*. Thus, pursuant to the technique 220, the transmitter 200 uses different pilot tones for adjacent (in time) OFDM symbols for purposes of aiding in the synchronization for the demodulation of these symbols, as described below.

Figure 9:
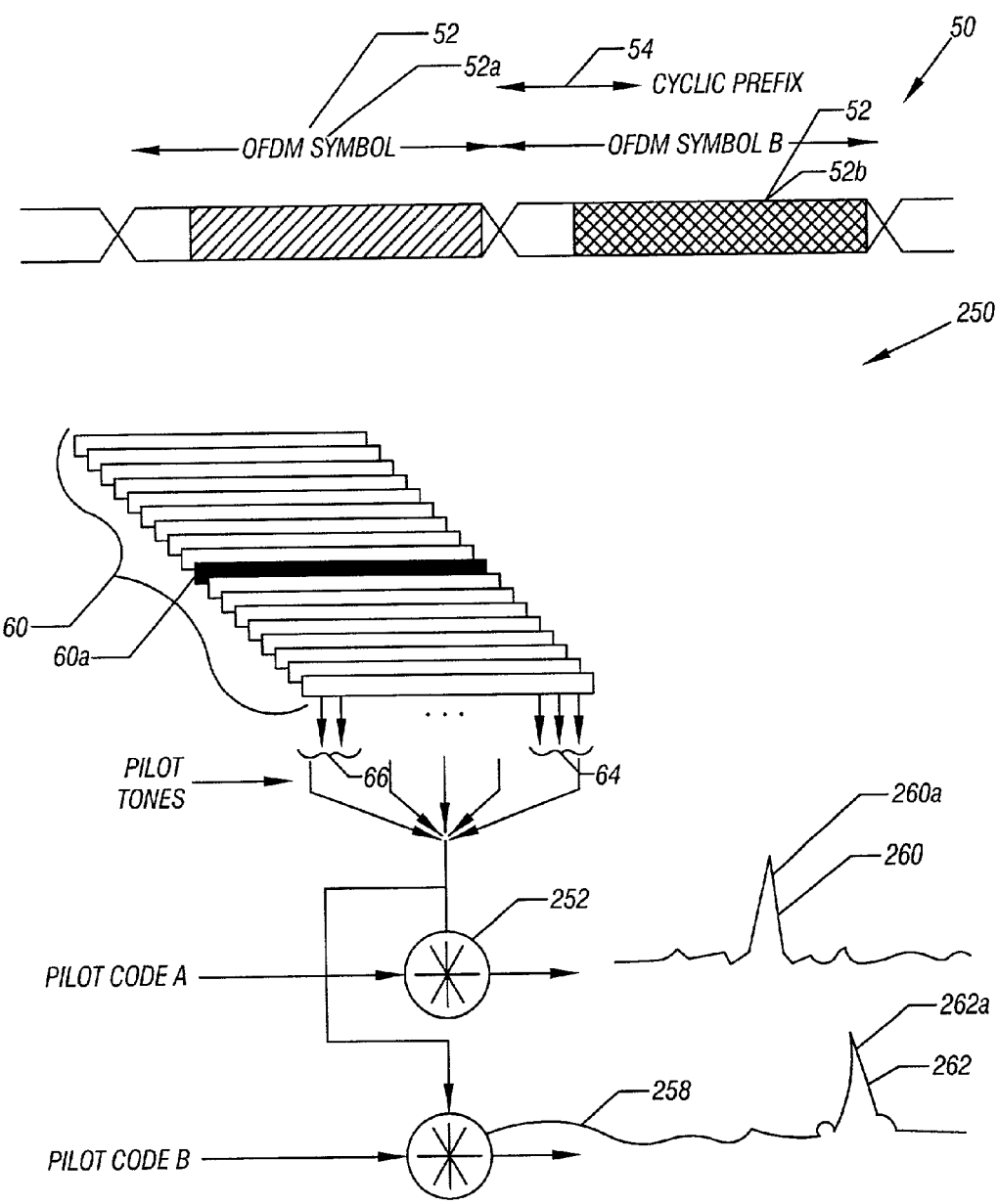
FIG. 9 is an illustration depicting a technique to locate optimal demodulation times for OFDM symbols according to an embodiment of the invention.

In this manner, adjacent OFDM symbols in time are assigned different known scrambling codes, so that the coefficients of adjacent sliding DFT windows may be correlated to identify the individual symbols and the best point in time to demodulate them. FIG. 9 further depicts an illustration 250 of a technique that may be applied to each sliding window DFT 60. As shown, each sliding window DFT produces coefficients 64 that are related to the output subcarriers and coefficients 66 that are related to the pilot tones that are associated with a particular OFDM symbol. The coefficients 64 and 66 of a particular sliding window DFT 60 are correlated with the pilot code A (via a correlator 252) and the pilot code B (via a correlator 258) to produce two respective correlation signals 260 and 262. In response to the sliding window DFT demodulating pilot tones that are scrambled via the pilot code A, the signal 260 peaks (as indicated by 260*a*) to indicate detection of the pilot code A.

Similarly, in response to a particular sliding window DFT demodulating pilot tones scrambled via the pilot code B, the signal 262 peaks (as indicated by the peak 262a) to indicate detection of the pilot code B.

Thus, in this manner, if the pilot codes A and B are used to scramble pilot tones in adjacent OFDM symbols, then the occurrence of the OFDM symbols 52 may be detected via the signals 260 and 262. This allows discrimination between adjacent symbols 52, as well as location of the optimal sampling point for demodulation. As an example, the pilot tones may be binary phase shift keyed (BPSK) modulated using a 15 bit pseudo noise (PN) sequence that is shifted four bits between adjacent symbols with a single bit added. However, it is certainly not necessary to use PN sequences for discrimination, and any disparate sequences with a reasonable Hamming distance will provide good performance. The correlator output signal peaks (such as the peaks 260a and 262a) that correspond to the optimal timing locations are identified by the low output variance on either side of the peak.

Thus the advantages of the above-described synchronization technique includes one or more of the following. First, the above-described synchronization permits faster acquisition. In this manner, because time synchronization may be done directly in the frequency domain at a greater increased sampling rate, acquisition time may be reduced significantly. This technique offers the potential of first symbol acquisition or burst acquisition of OFDM symbols, a particularly important advantage since long acquisition time is a consequence of many of the commonly used synchronization algorithms. Secondly, because the different pilot codes may be easily discriminated, it is possible to use the synchronization technique for multiple access. In this manner, a particular terminal may correlate pilots against a unique code assigned only to it, such that it does not demodulate OFDM symbols that are destined for other terminals. A third advantage is that the location of the optimal timing location reduces timing-error-induced "twist" in the demodulated signal. This eases the burden of the channel estimation and equalization algorithms so that more performance margin is available for correcting channel impairments rather than twist due to synchronization errors. Fourthly, latency is reduced. In this manner, when the optimal timing location is detected, the data is immediately available for channel estimation and equalization.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   generating a modulated signal, the signal comprising a first modulated symbol and a second modulated symbol adjacent to the first modulated symbol in time;
   scrambling first pilot tones associated with the first modulated symbol with a first pilot code; and
   scrambling second pilot tones associated with the second modulated symbol with a second pilot code to indicate a time interval in which to demodulate the first modulated symbol from the signal.

2. The method of claim 1, wherein the modulated signal comprises an Orthogonal Frequency Division Multiplexing signal.

3. The method of claim 1, further comprising:
   transmitting the modulated signal.

4. A method comprising:
   receiving a signal containing a modulated symbol;
   performing frequency transformations of the signal;
   correlating the frequency transformations with a first pilot code;
   correlating the frequency transformations with a second pilot code; and
   comparing the results of the correlations with the first and second pilot codes to select one of the frequency transformations to obtain an indication of the demodulated symbol.

5. The method of claim 4, wherein
   the first pilot code is associated with the symbol, and
   the second pilot code is associated with another symbol adjacent to the first symbol in time.

6. The method of claim 4, wherein the comparing of the results of the correlations comprises:
   finding a time interval between where the correlations peak.

7. The method of claim 4, wherein the signal comprises an Orthogonal Frequency Division Multiplexing signal.

8. An apparatus comprising:
   circuitry to receive a signal containing a modulated symbol; and
   an engine to:
      perform frequency transformations of the signal,
      correlate the frequency transformations with a first pilot code,
      correlate the frequency transformations with a second pilot code, and
      compare the results of the correlations with the first and second pilot codes to select one of the frequency transformations to obtain an indication of the demodulated symbol.

9. The apparatus of claim 8, wherein
   the first pilot code is associated with the symbol, and
   the second pilot code is associated with another symbol adjacent to the first symbol in time.

10. The apparatus of claim 8, wherein the engine finds a time interval between where the correlations peak to select one of the frequency transformations.

11. The apparatus of claim 8, wherein the signal comprises an Orthogonal Frequency Division Multiplexing signal.

12. An apparatus comprising:
   a processor to:
      generate a modulate signal, the signal comprising a first modulated symbol and a second modulated symbol adjacent to the first modulated symbol in time;
      scramble first pilot tones associated with the first modulated symbol with a first pilot tone;
      scramble second pilot tones associated with the second modulated symbol with a second pilot tone to indicate a time interval in which to demodulate the first modulated symbol from the signal; and
   a circuit to transmit the modulated signal.

13. The apparatus of claim 12, wherein the circuit comprises a circuit to transmit the modulated symbol over one of a wireless medium and a cable-based medium.

14. The apparatus of claim 12, wherein the modulated signal comprises an Orthogonal Frequency Division Multi plexing signal, wherein the first and second pilot tones aid in synchronizing demodulation of the first modulated symbol and the second modulated symbol.

15. The apparatus of 12, wherein the pilot tones comprise binary phase shift keyed modulated signals.

16. A system comprising:
an antenna;
a receiver coupled to the antenna to receive a signal containing a modulated symbol; and
a discrete Fourier transform engine:
  perform frequency transformations of the signal,
  correlate the frequency transformations with a first pilot code,
  correlate the frequency transformations with a second pilot code, and
  compare the results of the correlations with the first and second pilot codes to select one of the frequency transformations to obtain an indication of the demodulated symbol.

17. The system of claim 16, further comprising:
an analog-to-digital converter to convert the signal into a digital signal,
wherein the engine receives the digital signal.

18. The system of claim 16, wherein the engine finds a time interval between where the correlations peak to select one of the frequency transformations.

19. The system of claim 16, wherein the signal comprises an Orthogonal Frequency Division Multiplexing signal.

* * * * *

UNITED STATES PATENT AND TRADEMARK OFFICE
CERTIFICATE OF CORRECTION

PATENT NO. : 7,142,502 B2 Page 1 of 1
APPLICATION NO. : 09/943872
DATED : November 28, 2006
INVENTOR(S) : Eric A. Jacobsen It is certified that error appears in the above-identified patent and that said Letters Patent is hereby corrected as shown below:

Column 9:
Line 4, before "12", insert --claim--;
Line 10, after "engine" insert --to--.

Signed and Sealed this

Twenty-seventh Day of February, 2007

JON W. DUDAS
*Director of the United States Patent and Trademark Office*